F. H. MASON & J. ALLEN.
SEPARATING MECHANISM.
APPLICATION FILED MAY 23, 1913.
1,080,467.
Patented Dec. 2, 1913.
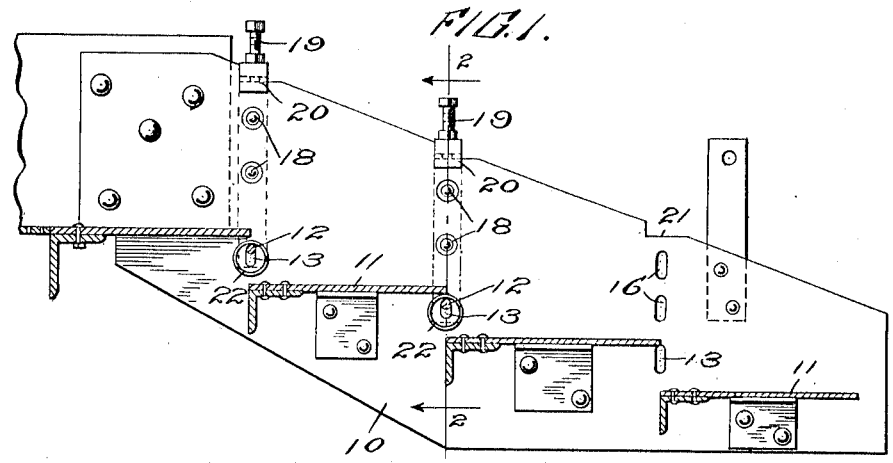
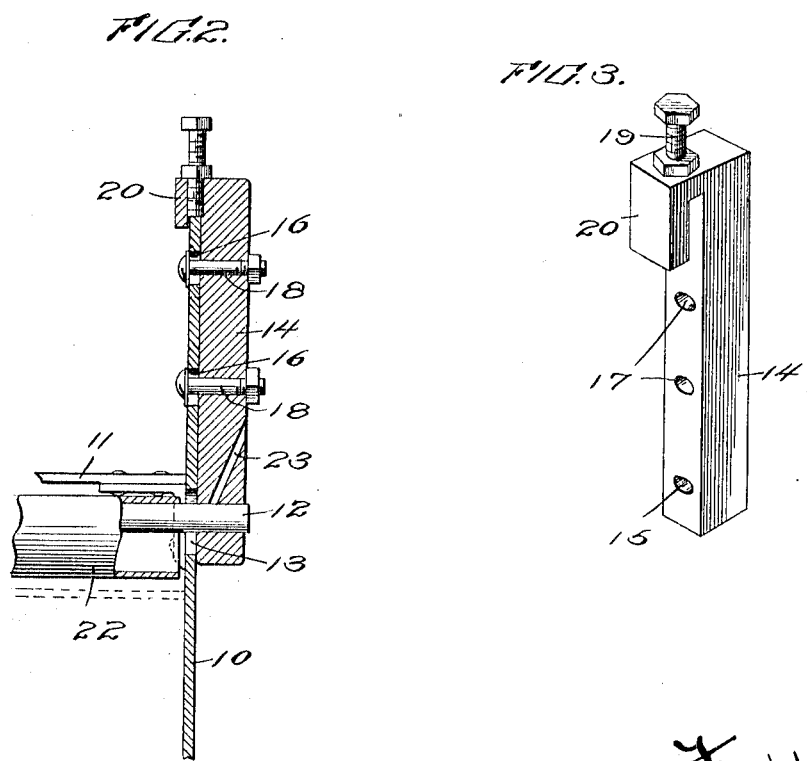

UNITED STATES PATENT OFFICE.

FRED H. MASON AND JAMES ALLEN, OF SCRANTON, PENNSYLVANIA.

SEPARATING MECHANISM.

1,080,467.  Specification of Letters Patent.  Patented Dec. 2, 1913.

Application filed May 23, 1913. Serial No. 769,510.

*To all whom it may concern:*

Be it known that we, FRED H. MASON and JAMES ALLEN, citizens of the United States, residing at Scranton, in the county of Lackawanna and State of Pennsylvania, have invented certain new and useful Improvements in Separating Mechanism; and we do hereby declare the following to be a full, clear, and exact description of the invention, such as will enable others skilled in the art to which it appertains to make and use the same.

This invention relates to separating mechanism and has for an object to provide an improvement upon the structure disclosed in Patent 1,021,690 granted to the present applicants under date of March 26, 1912.

With this and other objects in view the invention comprises certain novel constructions, combinations and arrangement of parts as will be hereinafter more fully described and claimed.

In the drawings: Figure 1 is a view of the side of a shaking section shown in elevation with the step plates in transverse section. Fig. 2 is a sectional view on line 2—2 of Fig. 1 showing the adjusting means. Fig. 3 is a perspective view of the adjusting member.

Like characters of reference designate corresponding parts throughout the several views.

In the said Patent 1,021,690 as in the present case a shaking frame section is provided here numbered as 10 with plates 11 rigidly secured therein in stepped relation.

The present invention comprises extending rods 12 across the shaking structure, such rods being extended through slots 13 in the sides of the frame member so that the said rods are vertically adjustable. To accomplish the adjustment of the said rods 12 members 14 are provided having openings 15 to permit the rod 12 to pass therethrough, such openings 15 registering with the slots 13. The sides of the frame work 10 are also provided with slots 16 registering with openings 17 formed in the member 14 with bolts 18 extended through the registering openings 17 and slots 16 whereby the member 14 is adjustable vertically in the slot 16 to adjust the rod 12 vertically. To facilitate the vertical adjustment of the member 14 and rod 12 a set screw 19 is inserted through a return bend 20 which hooks over the top of the side member of the frame 10 the set screw bearing against the side of a notch indicated at 21. It will, therefore, be apparent that by loosening the nuts of the bolts 18 the members 14 and the rods 12 carried thereby may be vertically adjusted and the adjusted position retained by clamping the nuts 18.

Upon the rods 12 are mounted pipe sections 22 which swing in the manner described in Patent 1,021,690, to permit the passage thereunder of slate, bone or the like but to prevent the passage of coal when the device is used for separating coal which is its usual and ordinary use, the coal passing over the outer ends of the plates 11, and an oil passage 23 is provided for lubricating the rod extending through the member 14 to the journal.

The present invention is, therefore, directed to mechanism for securing the vertical adjustment of the pipes 22 to vary the interval between the lower sides of said pipes 22 and the top side of the plate 11 immediately beneath to vary the discharge of extraneous material at the rear of the plates 11.

We claim:

1. In a separating mechanism, a plurality of plates arranged in horizontal planes and stepped relation, hollow cylinders disposed in the intervals between the steps and means engaging a portion of the inner wall of the cylinders at a point remote from the longitudinal axis thereof, for varying the elevation of the cylinders.

2. In a separating mechanism, a plurality of substantially horizontal plates arranged in stepped relation with the rear of one step substantially beneath the forward edge of the step above, hollow cylinders disposed in the intervals between such upper and lower plates, and means engaging a portion of the inner wall of the cylinders at a point remote from the longitudinal axis thereof, for varying the elevation of the cylinders.

3. In a separating mechanism, a plurality of plates arranged in horizontal planes and stepped relation, rods extending in the interval between the plates and in parallelism with the edges thereof, cylinders mounted upon the rods and adapted to swing, said rods constituting means for directly elevating the cylinders, and adjustable means for mounting the rods.

4. In a separating mechanism, a plurality of horizontal plates arranged in stepped relation with the rear of one plate substantially beneath and spaced from the forward edge of the plate above, a rod extending between the edges of the plates in substantial parallelism therewith, and a cylinder mounted upon the rod and adapted to swing with the rod as an axis and means for mounting the rod comprising members having a right angled portion at one end with a slot therein, a plate member having slots therein, the edge of the plate being received by the slot first mentioned, an adjusting member in said slot and engaging said edge, means passing through certain of the slots of the plate and supporting the rod mounting means, and said rod passing through one of the slots at a point opposite the point at which the rod enters the mounting means.

In testimony whereof we affix our signatures in presence of two witnesses.

FRED H. MASON.
JAMES ALLEN.

Witnesses:
HARRY B. COLE,
CORINNE CHAPMAN.

Copies of this patent may be obtained for five cents each, by addressing the "Commissioner of Patents, Washington, D. C."